June 30, 1936.　　　A. N. YOUNG　　　2,045,745
APPARATUS FOR CUTTING GLASS SHEETS
Filed June 30, 1933　　　2 Sheets-Sheet 1
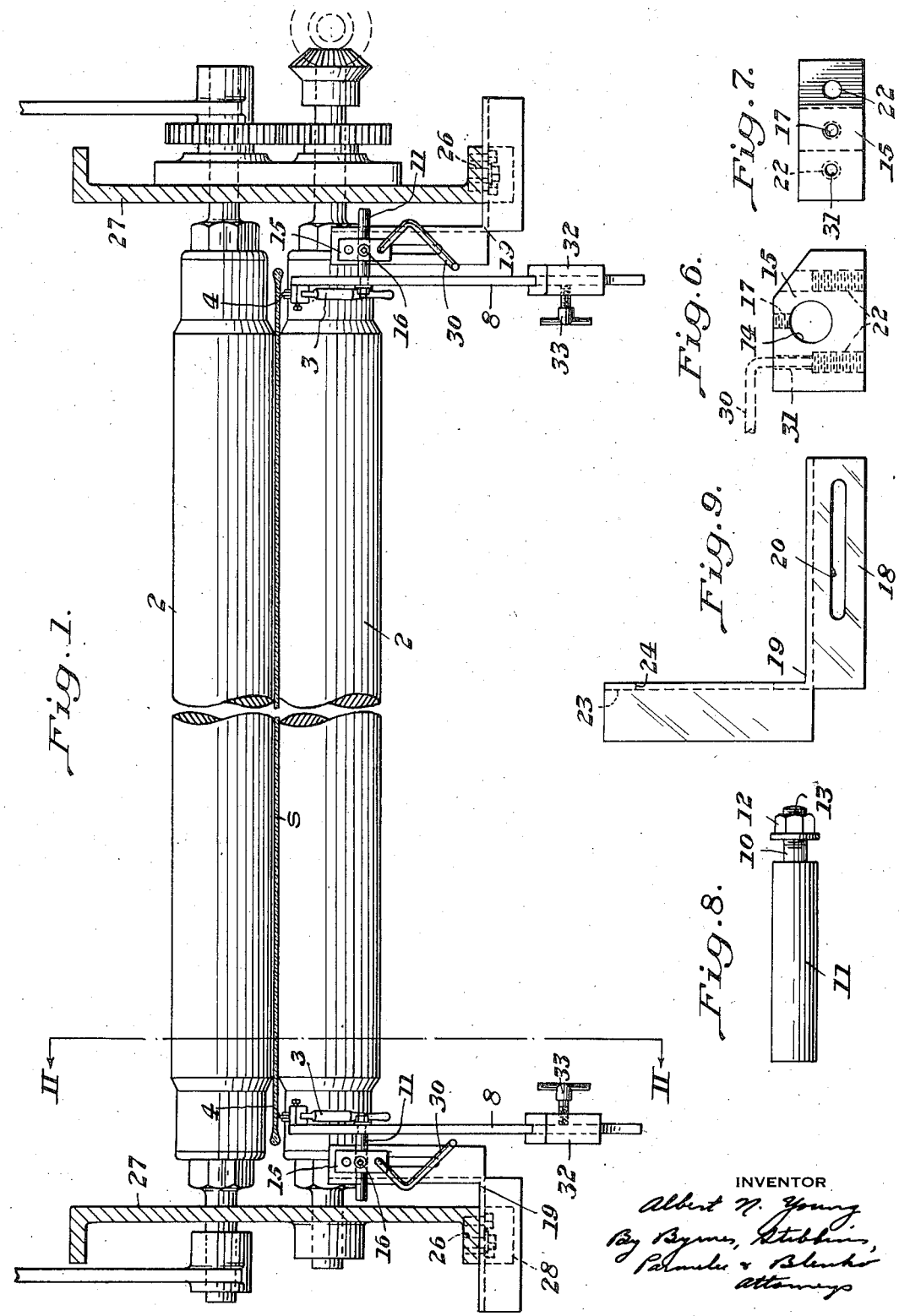

June 30, 1936.  A. N. YOUNG  2,045,745
APPARATUS FOR CUTTING GLASS SHEETS
Filed June 30, 1933  2 Sheets-Sheet 2
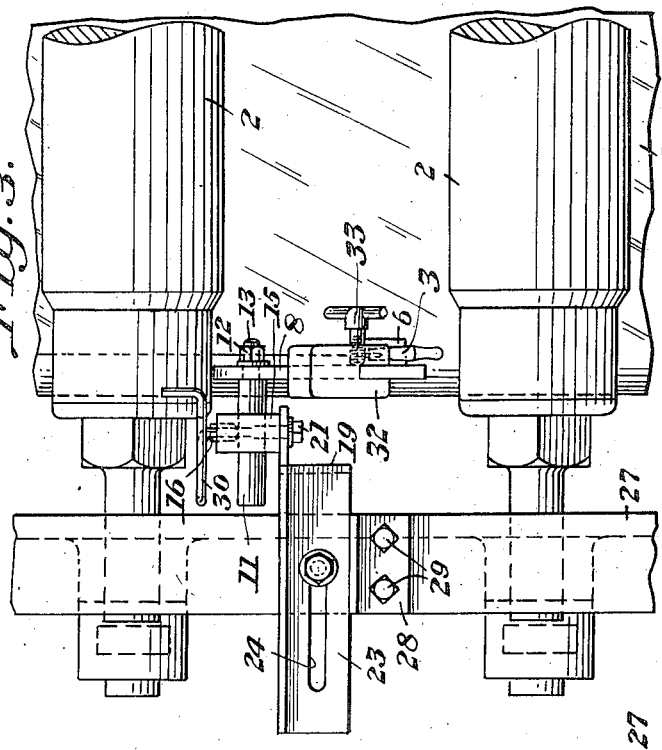
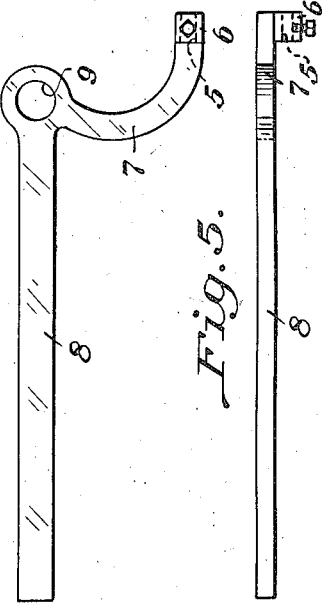
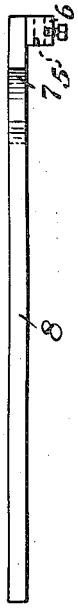
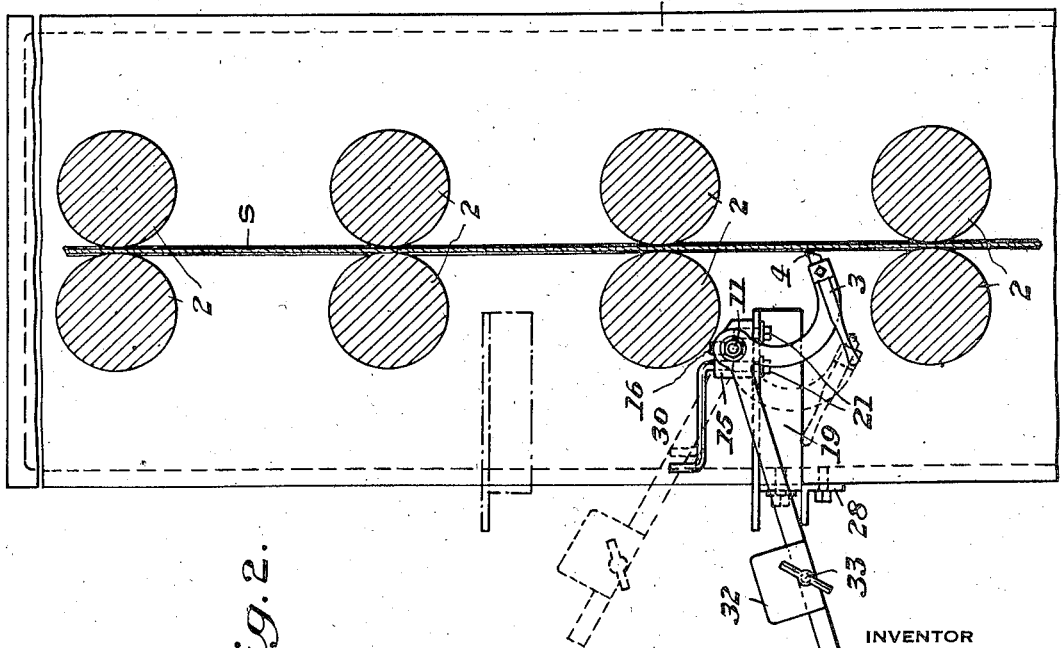

Patented June 30, 1936

2,045,745

UNITED STATES PATENT OFFICE 2,045,745

APPARATUS FOR CUTTING GLASS SHEETS

Albert N. Young, Belle Vernon, Pa., assignor to American Window Glass Company, Pittsburgh, Pa., a corporation of Pennsylvania Application June 30, 1933, Serial No. 678,444

2 Claims. (Cl. 33—32)

My invention relates generally to the manufacture of glass sheets, and more particularly to the cutting of the formed sheet, and provides an improved apparatus for removing the objectionable edges of the formed sheet and for cutting the sheet to a desired size.

In the manufacture of glass sheets, the sheets are drawn from a bath of molten glass by means of draft rollers. The formed sheet in some processes, such as the Forcault process, is drawn vertically through an annealing or cooling tunnel, and when a sufficient length of the sheet has been formed and sufficiently cooled, the vertically travelling sheet is scored cross-wise by a cutting tool, and that portion of the sheet above the score flexed relative to the remainder of the continuous sheet to cause the portion above the score to break away from the remainder of the sheet. In other processes, the formed sheet is drawn vertically by draft rollers and passes over suitably arranged horizontal rollers, and continues through the annealing or cooling tunnel in a horizontal direction. In such processes, when a sufficient length to form a sheet has been formed and sufficiently cooled, the horizontally travelling sheet is scored transversely thereof by a cutting tool and the portion of the sheet beyond the score flexed relative to the remainder of the sheet to cause the portions to separate.

In the drawing of glass sheets, the edges thereof are not uniform in thickness or have been defaced by the drawing apparatus, and it is necessary to remove these edges. In some proceses, the edges assume the form of small bulbs and it is necessary to remove these so-called "bulb edges" in order to obtain a sheet of uniform thickness from one edge to the other.

Heretofore, these bulb edges or otherwise objectionable edges have been removed from the sheets after severance from the formed continuous sheet. Heretofore, the continuous sheet has been scored and the portion above the score flexed so as to sever the sheet from the continuous sheet, and the individual sheets then placed on cutting tables and the defective edges removed and the sheets then passed through washing and drying operations. In some instances, the individual sheets after severance from the continuous sheet have been passed through the washing and drying operations and the defective edges removed thereafter. It has also heretofore been the practice to individually cut the severed sheets to appropriate widths before the washing and drying operations have been completed. My invention obviates this expensive handling of each individual glass sheet after severance from the continuous sheet.

By my invention I provide apparatus for removing the defective edges from the continuous rising sheet before it is severed into smaller sheets of the desired length. In accordance with my invention, not only may the continuously rising sheet be suitably scored for the removal of the defective edges, but the sheet may be cut or scored to the appropriate width at the same time, thereby obviating the necessity of further cutting in order to obtain sheets of the desired size. It will be understood, of course, that a single score line adjacent each edge of the continuously moving glass sheet will be sufficient to both remove the defective edges and cut the sheet to the desired width. I have found that sheets cut in accordance with my invention are sufficiently accurate for commercial purposes, and that additional cutting thereof is entirely unnecessary. The elimination of the step of cutting the individual sheets for the removal of the defective edges, and for cutting the sheets to the desired size, and the elimination of the handling of the sheets incident to said cutting, materially reduces the cost of manufacture.

In the accompanying drawings, I have shown for purposes of illustration only, a preferred embodiment of my invention. In the drawings, the apparatus which I provide is shown applied to a drawing process wherein the continuously rising glass sheet is drawn vertically until cut to the desired lengths. It will be understood, however, that my invention may be applied to a horizontally travelling glass sheet, and that it is not in any wise dependent upon the particular method of drawing used.

In the drawings—

Figure 1 is a sectional plan view of glass drawing apparatus with my invention applied thereto;

Figure 2 is a section taken along the line II—II of Figure 1;

Figure 3 is an enlarged elevational view of one end of the drawing apparatus shown in Figure 1;

Figure 4 is an elevational view of the cutter supporting arm;

Figure 5 is a plan view of the cutter supporting arm shown in Figure 4;

Figures 6 and 7 are detail views of the swivel block for carrying the cutter;

Figure 8 is a detail view of the stud on which the cutter supporting arm is mounted; and Figure 9 is a detail view of the angle bracket support which carries the swivel block shown in Figures 6 and 7.

As stated above, the glass sheet S is formed in continuous sheet form and is carried vertically by means of draft rollers 2 located in the annealing or cooling tunnel. Either one or both of the rolls 2 in each pair thereof may be driven by suitable power mechanism (not shown).

The cutting apparatus which I provide is arranged a short distance below the top of the machine where the sheet is normally broken off after it has been scored in the usual manner at a point near the top of the machine. In order to remove both defective edges of the glass sheet, it is necessary to provide a cutter adjacent each edge thereof for scoring the glass as it advances vertically. These cutters engage the glass sheet a suitable distance from the defective edges and are placed in a suitable position in relation to the moving glass in order to score the glass during its upward movement so that the edges may be broken off after a portion of the sheet has been scored for breaking it into smaller sheets. As the cutters mounted on each side of the machine are substantially alike, only one will be specifically described. It will be understood, however, that only slight modifications are necessary in order to provide a similar cutting device for the opposite side of the machine.

Each cutting device comprises a cutter 3 having a cutter wheel or tool 4 mounted on one end thereof. The cutter 3 is mounted in an opening 5 in the projection 6 carried by the curved or offset portion 7 of the cutter supporting arm 8. The cutter supporting arm 8 has an opening 9 therein adapted to receive the reduced portion 10 of the stud 11. The cutter supporting arm 8 is maintained on its pivotal mounting by means of a nut 12 cooperating with the threaded portion 13 of the stud 11.

The stud 11 is mounted in a horizontal opening 14 in the swivel block 15. The stud 11 is retained in any desired position in the opening 14 by means of a set screw 16 which cooperates with the threaded opening 17 of said swivel block. The stud 11 may be moved relative to the block 15 so as to adjust the cutter supporting arm 8 and the cutter carried thereby transversely of the vertically moving glass sheet.

The swivel block 15 is mounted on a horizontally extending flange 18 of the angle bracket 19. The horizontally extending flange 18 is provided with an elongated opening 20 adapted to receive bolts 21 threaded in openings 22 in the swivel block. The swivel block 15 may be adjusted along the flange 18 of the angle bracket support 19 so as to move the cutter toward or away from the vertically advancing sheet of glass.

The angle bracket support 19 is provided with a vertically extending flange 23 having an elongated opening 24 therein adapted to receive a bolt 25 threaded in an opening 26 in the main frame 27. As may be seen, the angle bracket 19 may be adjusted horizontally so as to move the cutter transversely of the advancing glass sheet. A clip angle 28 is bolted to the main frame 27 by means of bolts 29 immediately below the angle bracket support 19 which rests thereon.

An arm rest 30 is mounted in an opening 31 in the swivel block and is so arranged that it may be swung under the one end of the cutter supporting arm for maintaining the cutter out of contact with the glass sheet. This position is shown in dotted lines in Figure 2. When the cutter arm is in such position, the cutter wheel may be readily changed or a new cutter placed in position.

A counterweight 32 is provided on one arm of the cutter supporting arm 8 and is adapted to slide upon the arm and may be clamped in any desired position therealong by means of a thumbscrew 33. By merely adjusting the counterweight along the cutter supporting arm, any desired pressure may be applied to the cutting wheel against the moving sheet of glass.

As may be readily seen, the apparatus which I provide may be readily applied to existing machines, can be readily constructed, and will satisfactorily remove the defective edges from the continuous rising sheet of glass. It is so arranged as to provide a wide range of adjustability so as to permit the removal of any desired portion of the rising glass sheet adjacent each edge thereof.

While I have shown and described a preferred embodiment of my invention, it is to be understood that I do not intend to be limited thereby, but that my invention may be otherwise embodied within the scope of the appended claims.

I claim:

1. Apparatus for continuously scoring a vertically moving glass sheet as it is transported past said apparatus comprising a cutting tool, and means for yieldably supporting said tool in cutting engagement with said glass sheet comprising an angle bracket support, a support therefor, a swivel block adjustably mounted on said bracket, a stud carried by said block, a cutter supporting arm pivotally mounted intermediate its ends on said stud and between the edges of said sheet, means for clamping the cutter to said arm, and means for rotating said arm about its pivot for holding the cutter in engagement with the glass sheet.

2. Apparatus for continuously scoring a vertically moving glass sheet as it is transported past said apparatus comprising a cutting tool, means for yieldably supporting said tool in cutting engagement with said glass sheet, comprising an angle bracket support, a support therefor, a swivel block adjustably mounted on said bracket, a stud carried by said block, a cutter supporting arm pivotally supported intermediate its ends on said stud and between the edges of said sheet, said arm having a vertically offset portion adjacent one end thereof, means for clamping the cutter on said offset portion, and means for rotating said arm about its pivot for holding the cutter in engagement with the glass sheet.

ALBERT N. YOUNG.